(12) United States Patent
Suzuki

(10) Patent No.: US 9,381,587 B2
(45) Date of Patent: Jul. 5, 2016

(54) WIRE ELECTRIC DISCHARGE MACHINE WHICH PERFORMS TAPER CUTTING

(71) Applicant: FANUC Corporation, Yamanashi (JP)

(72) Inventor: Koji Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 138 days.

(21) Appl. No.: 14/250,536

(22) Filed: Apr. 11, 2014

(65) Prior Publication Data

US 2014/0305909 A1    Oct. 16, 2014

(30) Foreign Application Priority Data

Apr. 15, 2013  (JP) ................................. 2013-085140

(51) Int. Cl.

| | |
|---|---|
| *B23H 7/06* | (2006.01) |
| *B23H 7/20* | (2006.01) |
| *B23H 1/00* | (2006.01) |
| *B23H 11/00* | (2006.01) |
| *G05B 19/4093* | (2006.01) |
| *B23H 1/02* | (2006.01) |

(52) U.S. Cl.
CPC .................. *B23H 1/00* (2013.01); *B23H 7/065* (2013.01); *B23H 11/003* (2013.01); *G05B 19/40937* (2013.01); *B23H 1/02* (2013.01); *G05B 2219/45043* (2013.01); *Y02P 90/265* (2015.11)

(58) Field of Classification Search
CPC ........ B23H 1/00; B23H 11/003; B23H 7/065; B23H 1/02; B23H 7/06; B23H 7/20; G05B 19/40937; G05B 19/45043; G05B 2219/45043
See application file for complete search history.

(56) References Cited

U.S. PATENT DOCUMENTS

| | | | | |
|---|---|---|---|---|
| 4,547,646 A | * | 10/1985 | Briffod ..................... | B23H 7/06 219/69.12 |
| 4,661,678 A | * | 4/1987 | Wavre ....................... | B23H 7/06 219/69.12 |
| 4,843,203 A | * | 6/1989 | Gamo ...................... | B23H 7/065 219/69.12 |
| 4,960,971 A | * | 10/1990 | Kawanabe ................ | B23H 7/06 219/69.12 |
| 5,689,427 A | * | 11/1997 | Li ............................. | B23H 7/04 219/69.12 |
| 7,211,762 B2 | * | 5/2007 | Kinoshita ................. | B23H 7/04 219/69.12 |

(Continued)

FOREIGN PATENT DOCUMENTS

| | | |
|---|---|---|
| CN | 1968780 A | 5/2007 |
| CN | 101132878 A | 2/2008 |

(Continued)

OTHER PUBLICATIONS

Machine translation of Japan Patent document No. 2005-349,520, Oct. 2015.*

(Continued)

*Primary Examiner* — Geoffrey S Evans
(74) *Attorney, Agent, or Firm* — Hauptman Ham, LLP

(57) ABSTRACT

A wire electric discharge machine for taper cutting includes a table on which a workpiece is mounted, at least two linear axes for moving the workpiece and a wire electrode relative to each other, a mount portion capable of being mounted on the table, and a control unit. The workpiece can be attached to the mount portion, and the mount portion has at least two rotary axes. The control unit synchronously moves the linear axes and the rotary axes in accordance with a machining program to perform machining while relatively changing the tilt of the workpiece with respect to the wire electrode.

3 Claims, 14 Drawing Sheets

<TAPER CUTTING OF PRESENT INVENTION>

(56) References Cited

U.S. PATENT DOCUMENTS

| | | |
|---|---|---|
| 2006/0102596 A1 | 5/2006 | Kinoshita et al. |
| 2007/0068905 A1* | 3/2007 | Miyajima .............. B23H 7/065 219/69.12 |
| 2009/0065483 A1 | 3/2009 | Hayashi |
| 2012/0152906 A1 | 6/2012 | Sato |
| 2012/0312786 A1 | 12/2012 | Arakawa et al. |

FOREIGN PATENT DOCUMENTS

| | | | |
|---|---|---|---|
| DE | 102011108282 A1 | | 2/2012 |
| EP | 1657016 A2 | | 5/2006 |
| EP | 2532464 A2 | | 12/2012 |
| JP | 60-259-324 A | * | 12/1985 |
| JP | 62-166922 A | * | 7/1987 |
| JP | 62166922 A | | 7/1987 |
| JP | 63-011226 A | * | 1/1988 |
| JP | 2002126948 A | | 5/2002 |
| JP | 2005-349520 A | * | 12/2005 |
| JP | 2005349520 A | | 12/2005 |
| JP | 2012-254505 A | | 12/2012 |
| JP | 2012-254505 A | * | 12/2012 |

OTHER PUBLICATIONS

Machine translation of Japan Patent document No. 2012-254,505, Oct. 2015.*

Extended European Search Report issued Dec. 9, 2014, corresponding to European patent application No. 14163099.6.

Ren Fujun et al, "The Universal Mathematical Models of Spatial Curved Surface in Cartesian Coordinates with NC-WEDM-HS", Industrial Technology, 2008. ICIT 2008. IEEE International Conference on, IEEE, Piscataway, NJ, USA, Apr. 21, 2008, pp. 1-6, XP031313804, ISBN: 978-1-4244-1705-6.

Office Action mailed Sep. 2, 2014, corresponding to Japanese patent application No. 2013-085140.

Office Action dated Aug. 5, 2015, corresponding to Chinese patent application No. 201410147996.9.

Office Action dated Sep. 24, 2015, corresponding to European patent application No. 14163099.6.

* cited by examiner

INTERSECTION OF WORKPIECE TOP
SURFACE AND WIRE ELECTRODE : Pt0、Pt1

INTERSECTION OF WORKPIECE BOTTOM
SURFACE AND WIRE ELECTRODE : Pb0、Pb1

$\theta$ rtox : TILT ANGLE OF WIRE ELECTRODE
IN Y-AXIS DIRECTION

θroty : TILT ANGLE OF WIRE ELECTRODE IN X-AXIS DIRECTION

<CONVENTIONAL TAPER CUTTING>

<TAPER CUTTING OF PRESENT INVENTION>

EXAMPLE OF WIRE GUIDE HAVING SMALL RADIUS OF CURVATURE

- WIRE DOES NOT EASILY BEND
- WIRE VIBRATES
- UNSTABLE MACHINING

SUPPORT POINT

EXAMPLE OF WIRE GUIDE HAVING LARGE RADIUS OF CURVATURE

- WIRE EASILY BENDS
- STABLE MACHINING
- SUPPORT POINT HAS LARGE ERROR

SUPPORT POINT

SUPPORT POINT

<CONVENTIONAL TAPER CUTTING>

<TAPER CUTTING OF PRESENT INVENTION>

INTERSECTION OF WORKPIECE TOP SURFACE AND WIRE ELECTRODE:
Pt0, Pt1, Pt2, Pt3
INTERSECTION OF WORKPIECE BOTTOM SURFACE AND WIRE ELECTRODE:
Pb0, Pb1, Pb2, Pb3

FIG.11
```
O0002(taper SAMPLE 2)
G666P1
G92X5.Y-35.                    MACHINING START POINT
G90G01G42X10.                  OFFSET PROCESSING
Y-30.                          MOVE TOWARD POINTS $P_{t0}$ AND $P_{b0}$
Y-20.                          MOVE TOWARD POINTS $P_{t1}$ AND $P_{b1}$
X20.U-5.V5.                    MOVE TOWARD POINTS $P_{t2}$ AND $P_{b2}$
Y-10.U0.V0                     MOVE TOWARD POINTS $P_{t3}$ AND $P_{b3}$
X35.
G40Y-5.                        MACHINING END POINT
G666P0
M30
```
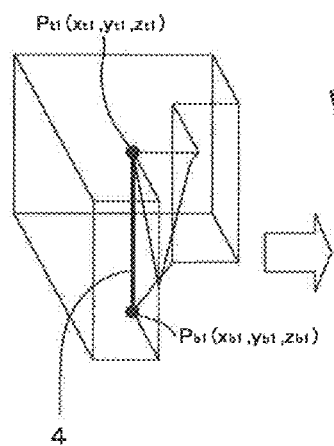
FIG.12A
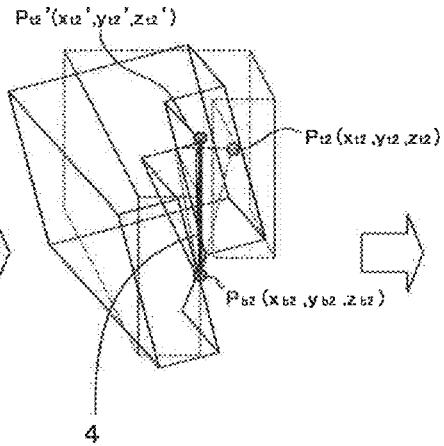
FIG.12B
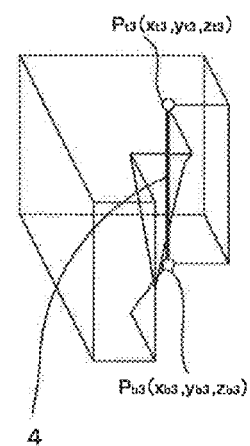
FIG.12C INTERSECTION OF WORKPIECE TOP SURFACE AND WIRE ELECTRODE:
Pt0, Pt1, Pt2, Pt3
INTERSECTION OF WORKPIECE BOTTOM SURFACE AND WIRE ELECTRODE:
Pb0, Pb1, Pb2, Pb3

MACHINING END POINT

MACHINING START POINT

INTERSECTION OF WORKPIECE TOP SURFACE AND WIRE ELECTRODE:
Pt0, Pt1, Pt2, Pt3
INTERSECTION OF WORKPIECE BOTTOM SURFACE AND WIRE ELECTRODE:
Pb0, Pb1, Pb2, Pb3

FIG.17

```
O0001(taper SAMPLE)
M15
G92X5.Y-35.                    MACHINING START POINT
G90G01G42X10.                  OFFSET PROCESSING
Y-30.                          MOVE TOWARD POINTS P_{t0} AND P_{b0}
Y-20.                          MOVE TOWARD POINTS P_{t1} AND P_{b1}
X20.U-5.V5.                    MOVE TOWARD POINTS P_{t2} AND P_{b2}
Y-10.U0.V0                     MOVE TOWARD POINTS P_{t3} AND P_{b3}
X35.
G40Y-5.                        MACHINING END POINT
M30
```

WIRE ELECTRIC DISCHARGE MACHINE WHICH PERFORMS TAPER CUTTING

BACKGROUND OF THE INVENTION

1. Field of the Invention

The present invention relates to a wire electric discharge machine which performs taper cutting.

2. Description of the Related Art

FIG. 15 shows taper cutting using a wire electric discharge machine in which machining is performed while a wire electrode supported by wire guide portions is extended obliquely with respect to a vertical direction 5 by moving the upper guide portion parallel to the plane of a table. As shown in FIG. 15, in conventional taper cutting, discharge machining is performed on a workpiece 3 mounted on the table 2 with the wire electrode 4 tilted with respect to the vertical direction 5.

Taper cutting in which machining is performed with the wire electrode 4 extended obliquely with respect to the vertical direction 5 has more technical problems than vertical cutting in which machining is performed with the wire electrode 4 extended vertically. Some of these problems are listed below.
1) Machining speed cannot be increased due to the difficulty of removal of machining sludge.
2) Frictional forces are exerted on the wire electrode by the wire guide portions to adversely affect surface roughness.
3) Support points of the wire electrode bent by the wire guide portions change depending on the accuracies of the shapes of the guides and the state of machining, thus making accurate machining difficult.
4) It is difficult to set machining conditions.

These are problems caused by obliquely extending the wire electrode, and have the property of becoming more significant with increasing taper angle.

Now, a conventional taper cutting technique will be described by taking as an example the machining of a workpiece in which the shape of a top surface is different from that of a bottom surface, such as shown in FIGS. 16A to 16C. A machining program for the workpiece is shown in FIG. 17. It should be noted that U/V commands specify the amounts of travel of the wire electrode 4 at the top surface of the workpiece in the X/Y directions.

Operations in accordance with the machining program shown in FIG. 17 will be described.

First, the command M15 enables the function of taper cutting.

The command G92X5.0000Y-35.0000 sets a coordinate system for the machining program and a machining start point (5,-35).

The command G90G01G42X10. moves the wire electrode 4 to the machining start point compensated by an offset.

The command Y-30. moves the workpiece-top side of the wire electrode 4 toward a point $P_{t0}$ and the workpiece-bottom side of the wire electrode 4 toward a point $P_{b0}$.

The command Y-20. moves the workpiece-top side of the wire electrode 4 toward a point $P_{t1}$ and the workpiece-bottom side of the wire electrode 4 toward a point $P_{b1}$.

The command X20.U-5.V5. moves the workpiece-top side of the wire electrode 4 toward a point $P_{t2}$ and the workpiece-bottom side of the wire electrode 4 toward a point $P_{b2}$ while tilting the wire.

The command Y-10.U0.V0. moves the workpiece-top side of the wire electrode 4 toward a point $P_{t3}$ and the workpiece-bottom side of the wire electrode 4 toward a point $P_{b3}$ while restoring the wire electrode 4 to an upright position.

The command X35. moves the wire electrode 4 to a point outside the workpiece 3.

The command G40Y-5. moves the wire electrode 4 toward a machining end point.

As described above, in the conventional taper cutting technique, machining is performed with the wire electrode 4 tilted while the tilt thereof is being changed during the machining. Accordingly, the aforementioned problems occur.

To cope with the problems, Japanese Patent Application Laid-Open No. 2012-254505 discloses a wire electric discharge machine including a table which has a plane formed by two orthogonal axes and a coordinate system and on which a workpiece is mounted, and a mount portion for mounting the workpiece obliquely with respect to the plane. The wire electric discharge machine performs discharge machining while moving a wire electrode and the workpiece relative to each other in accordance with a machining program for taper cutting. The coordinate system is converted by tilting the coordinate system by an angle equal to the tilt angle of the obliquely mounted workpiece with respect to the plane. Based on the converted coordinate system, specified machining values commanded by the machining program are compensated.

The wire electric discharge machine disclosed in Japanese Patent Application Laid-Open No. 2012-254505 deals with the same problems as the present invention, and reduces the tilt of a wire electrode by tilting a workpiece at a fixed angle during machining, thus trying to solve the problems of taper cutting. However, the wire electrode is actually tilted at a slight angle. Accordingly, the aforementioned problems caused by extending the wire electrode obliquely with respect to the vertical direction cannot be well avoided.

SUMMARY OF THE INVENTION

In view of the above-described problems of the prior art techniques, an object of the present invention is to provide a wire electric discharge machine which can reduce the tilt of a wire electrode by performing machining while the tilt of a workpiece is being changed during the machining.

A wire electric discharge machine according to the present invention includes a table on which a workpiece is mounted; at least two linear axes for moving a wire electrode and the workpiece relative to each other; a mount portion to which the workpiece can be attached and which can be mounted on the table, the mount portion having at least two rotary axes; and a control unit for synchronously moving the linear axes and the rotary axes in accordance with a machining program to perform machining while relatively changing a tilt of the workpiece with respect to the wire electrode.

The control unit may generate, based on a tilt angle of the wire electrode and amounts of travel of the wire electrode by the linear axes relative to the workpiece, which are commanded by the machining program, and on prestored axes of rotation of the rotary axes, renewed amounts of travel of the wire electrode relative to the workpiece and amounts of rotation of the rotary axes for performing machining with the wire electrode vertically oriented. Further, the control unit may find rotation matrices using the axes of rotation and the tilt angle of the wire electrode from a vertical direction, and find amounts of travel of the wire electrode relative to the workpiece and amounts of rotation of the rotary axes using the found rotation matrices.

The control unit may convert, based on a tilt angle of the wire electrode and amounts of travel of the wire electrode, the tilt angle and the amounts of travel being commanded by the machining program, and on prestored axes of rotation of the rotary axes, a command for tilting the wire electrode and a command for moving the wire electrode relative to the workpiece in the machining program for performing machining with the wire electrode vertically oriented, to a command for moving the wire electrode with respect to the workpiece and a command for rotating the rotary axes.

The present invention can provide a wire electric discharge machine which can reduce the tilt of a wire electrode by performing machining while the tilt of a workpiece is being changed during the machining. Thus, problems which would occur when the wire electrode is obliquely extended can be avoided.

BRIEF DESCRIPTION OF THE DRAWINGS

The forgoing and other objects and feature of the invention will be apparent from the following description of preferred embodiments of the invention with reference to the accompanying drawings, in which:

FIG. 11 illustrates a machining program for the machining of a workpiece shown in FIGS. 10A to 10C.

FIGS. 12A, 12B, and 12C are views for explaining that in the case of taper cutting using the wire electric discharge machine according to the present invention, machining can be performed with a wire electrode held in an upright position (vertically oriented) while the tilt of a workpiece is being changed.

FIG. 17 is a view for explaining a machining program for taper cutting by the conventional taper cutting technique.

DETAILED DESCRIPTION OF THE PREFERRED EMBODIMENTS

Figure 1:
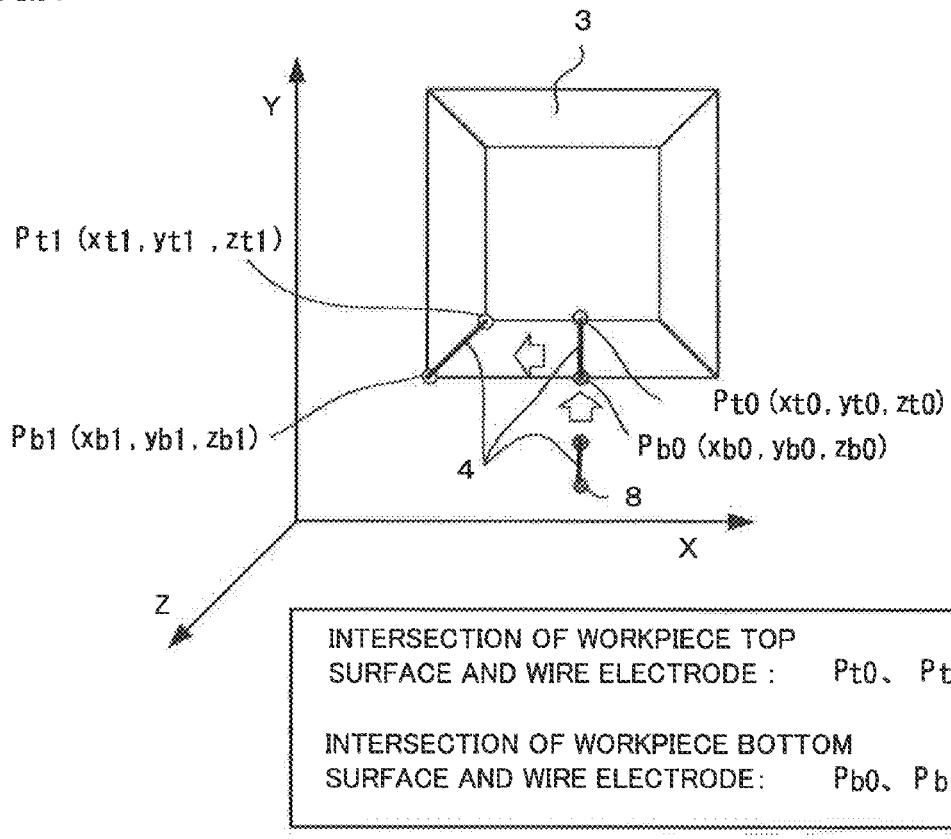
FIG. 1 illustrates an example in which taper cutting is performed on a workpiece mounted on an XY table by tilting a wire electrode.

In the present invention, to solve problems of the prior art techniques, electrical discharge machining is performed with a wire electrode held in an upright position (vertically oriented) while the tilt of a workpiece is being changed. An explanation will be made by taking as an example the case where a workpiece 3 is machined into a shape such as shown in FIG. 1. It should be noted that the upright position of the wire electrode may be an upright position in a range in which the aforementioned problems of the prior art techniques can be avoided, e.g., an upright position in which the taper angle is 5 degrees or less.

In a conventional taper cutting technique, first, a wire electrode 4 is at a machining start point 8. Next, while the tilt of the wire electrode 4 is being changed in the Y-axis direction, the workpiece-top side of the wire electrode 4 moves toward a point $P_{t0}$, and the workpiece-bottom side of the wire electrode 4 moves toward a point $P_{b0}$. Then, the workpiece-top side of the wire electrode 4 moves toward a point $P_{t1}$, and the workpiece-bottom side of the wire electrode 4 moves toward a point $P_{b1}$.

Next, a taper cutting method of the present invention in which taper cutting by wire electrical discharge machining is performed with the wire electrode 4 held in an upright position will be described with reference to FIGS. 1 to 3. It should be noted that the workpiece 3 is assumed to be capable of being tilted about axes of rotation 6 and 7 passing through a point $P_b$ and intersecting the YZ plane (see FIG. 2) and the XZ plane (see FIG. 3) at right angles, respectively.

Figure 2:
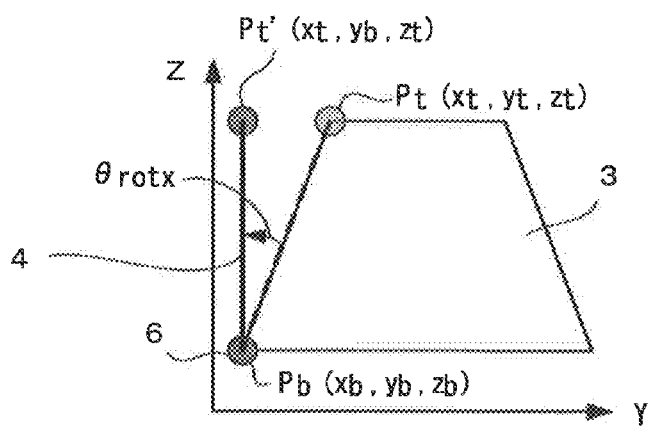
FIG. 2 illustrates the workpiece of FIG. 1 as seen along the −X axis.

The projections of the points $P_t$ and $P_b$ onto the YZ plane of FIG. 1 are shown in FIG. 2. In FIG. 2, to make the wire electrode 4 parallel to the Z axis (upright position), the wire electrode 4 needs to be tilted about the point $P_b$ by $\theta_{rotx}$. The intersection of the wire electrode 4 and a top surface of the workpiece 3 is denoted by $P_2'$. The angle $\theta_{rotx}$ can be expressed as the following expression (1):

$$\theta_{rotx} = \tan^{-1}((y_t - y_b)/(z_t - z_b)) \qquad (1)$$

A rotation matrix $M_{rotx}$ about the axis (axis of rotation 6) passing through a point $P_b$ and intersecting the YZ plane at right angles is expressed as the following expression (2):

$$M_{rotx} = \begin{bmatrix} 1 & 0 & 0 \\ 0 & \cos\theta_{rotx} & -\sin\theta_{rotx} \\ 0 & \sin\theta_{rotx} & \cos\theta_{rotx} \end{bmatrix} \qquad (2)$$

$$= \begin{bmatrix} 1 & 0 & 0 \\ 0 & \cos\left(\tan^{-1}\left(\frac{y_t - y_b}{z_t - z_b}\right)\right) & -\sin\left(\tan^{-1}\left(\frac{y_t - y_b}{z_t - z_b}\right)\right) \\ 0 & \sin\left(\tan^{-1}\left(\frac{y_t - y_b}{z_t - z_b}\right)\right) & \cos\left(\tan^{-1}\left(\frac{y_t - y_b}{z_t - z_b}\right)\right) \end{bmatrix}$$

Therefore, an expression for finding the point $P_t'$ is expressed as the following expression (3):

$$P_t' = M_{rotx} \times P_t \quad (3)$$

$$= \begin{bmatrix} 1 & 0 & 0 \\ 0 & \cos\left(\tan^{-1}\left(\frac{y_t - y_b}{z_t - z_b}\right)\right) & -\sin\left(\tan^{-1}\left(\frac{y_t - y_b}{z_t - z_b}\right)\right) \\ 0 & \sin\left(\tan^{-1}\left(\frac{y_t - y_b}{z_t - z_b}\right)\right) & \cos\left(\tan^{-1}\left(\frac{y_t - y_b}{z_t - z_b}\right)\right) \end{bmatrix} \times P_t$$

Figure 3:
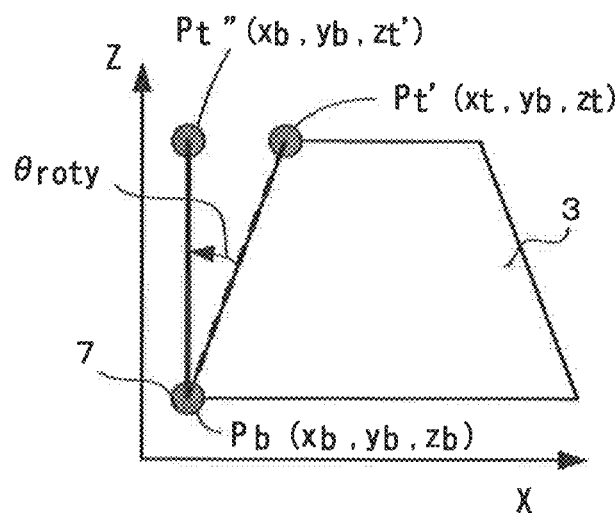
FIG. 3 illustrates the workpiece of FIG. 1 as seen along the Y axis.

Subsequently, the projections of the points $P_t$ and $P_b$ onto the XZ plane of FIG. 1 are shown in FIG. 3. In FIG. 3, to make the wire electrode 4 parallel to the Z axis (upright position), the wire electrode 4 needs to be tilted about the point $P_b$ by $\theta_{roty}$. The intersection of the wire electrode 4 and the top surface of the workpiece 3 is denoted by $P_t''$. The angle $\theta^{roty}$ can be expressed as the following expression (4):

$$\Theta_{roty} = \tan^{-1}((x_t - x_b)/(z_t - z_b)) \quad (4)$$

A rotation matrix $M_{roty}$ about the axis (axis of rotation 7) passing through the point $P_b$ and intersecting the XZ plane at right angles is expressed as the following expression (5):

$$M_{roty} = \begin{bmatrix} \cos\theta_{roty} & 0 & \sin\theta_{roty} \\ 0 & 1 & 0 \\ -\sin\theta_{roty} & 0 & \cos\theta_{roty} \end{bmatrix} \quad (5)$$

$$= \begin{bmatrix} \cos\left(\tan^{-1}\left(\frac{x_t - x_b}{z_t - z_b}\right)\right) & 0 & \sin\left(\tan^{-1}\left(\frac{x_t - x_b}{z_t - z_b}\right)\right) \\ 0 & 1 & 0 \\ -\sin\left(\tan^{-1}\left(\frac{x_t - x_b}{z_t - z_b}\right)\right) & 0 & \cos\left(\tan^{-1}\left(\frac{x_t - x_b}{z_t - z_b}\right)\right) \end{bmatrix}$$

Therefore, an expression for finding the point $P_t''$ is expressed as the following expression (6):

$$P_t'' = M_{roty} \times P_t' \quad (6)$$

$$= \begin{bmatrix} \cos\left(\tan^{-1}\left(\frac{x_t - x_b}{z_t - z_b}\right)\right) & 0 & \sin\left(\tan^{-1}\left(\frac{x_t - x_b}{z_t - z_b}\right)\right) \\ 0 & 1 & 0 \\ -\sin\left(\tan^{-1}\left(\frac{x_t - x_b}{z_t - z_b}\right)\right) & 0 & \cos\left(\tan^{-1}\left(\frac{x_t - x_b}{z_t - z_b}\right)\right) \end{bmatrix} \times P_t'$$

Further, from the above expressions (3) and (6), the point $P_t''$ is expressed as the following expression (7):

$$P_t'' = M_{roty} \times P_t'$$
$$= M_{roty} \times M_{rotx} \times P_t$$
$$= \begin{bmatrix} \cos\left(\tan^{-1}\left(\frac{x_t - x_b}{z_t - z_b}\right)\right) & \sin\left(\tan^{-1}\left(\frac{x_t - x_b}{z_t - z_b}\right)\right)\sin\left(\tan^{-1}\left(\frac{y_t - y_b}{z_t - z_b}\right)\right) & \sin\left(\tan^{-1}\left(\frac{x_t - x_b}{z_t - z_b}\right)\right)\cos\left(\tan^{-1}\left(\frac{y_t - y_b}{z_t - z_b}\right)\right) \\ 0 & \cos\left(\tan^{-1}\left(\frac{y_t - y_b}{z_t - z_b}\right)\right) & -\sin\left(\tan^{-1}\left(\frac{y_t - y_b}{z_t - z_b}\right)\right) \\ -\sin\left(\tan^{-1}\left(\frac{x_t - x_b}{z_t - z_b}\right)\right) & \cos\left(\tan^{-1}\left(\frac{x_t - x_b}{z_t - z_b}\right)\right)\sin\left(\tan^{-1}\left(\frac{y_t - y_b}{z_t - z_b}\right)\right) & \cos\left(\tan^{-1}\left(\frac{x_t - x_b}{z_t - z_b}\right)\right)\cos\left(\tan^{-1}\left(\frac{y_t - y_b}{z_t - z_b}\right)\right) \end{bmatrix} \times \begin{bmatrix} x_t \\ y_t \\ z_t \end{bmatrix} \quad (7)$$

As described above, the upright position of the wire electrode 4 can be calculated by finding the rotation matrices. Moreover, to change the tilt of the workpiece 3, $\theta_{roty}$ and $\theta_{rotx}$ found in the above-described process can be used as tilt angles. In this way, machining can be performed with the wire electrode 4 held in an upright position (vertically oriented) while the tilt of the workpiece 3 is being changed.

Now, an explanation of how the present invention can solve the aforementioned problems of the prior art techniques will be given.

Figure 4A:
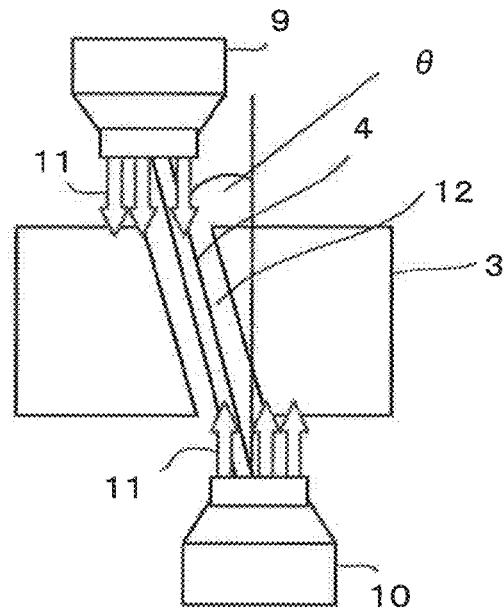
FIGS. 4A and 4B are views for explaining the removal of machining sludge from a machined groove.
Figure 4B:
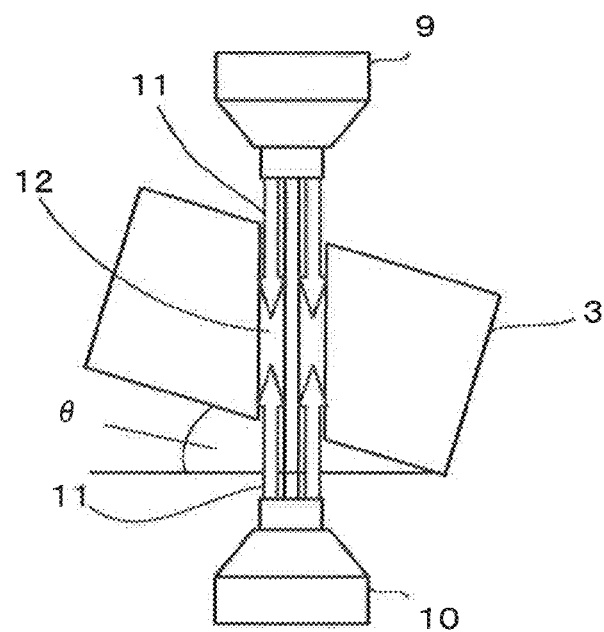

With regard to the problem "1) machining speed cannot be increased due to the difficulty of removal of machining sludge":

FIGS. 4A and 4B are views for explaining the removal of machining sludge from a machined groove. In the conventional taper cutting method, since the wire electrode 4 is tilted from a position perpendicular to the plane of the table by an angle corresponding to a taper angle as shown in FIG. 4A, the direction of emission of machining fluid does not coincide with the orientation of the wire electrode 4, and it is difficult for the machining fluid to flow into the machined groove. Accordingly, machining sludge cannot be efficiently removed.

On the other hand, in taper cutting using a wire electric discharge machine according to the present invention, the workpiece is tilted by an angle corresponding to the taper angle from the plane of the table as shown in FIG. 4B. The relative positional relationship of the wire electrode 4 with respect to the workpiece is the same as in the conventional taper cutting (FIG. 4A). However, in the case of FIG. 4B, the wire electrode 4 is in a position perpendicular to the plane of the table, and therefore the machining fluid smoothly flows into the machined groove as in vertical cutting. Accordingly, machining sludge can be efficiently removed. In other words, taper cutting using the wire electric discharge machine according to the present invention solves the problem 1).

Figure 5A:
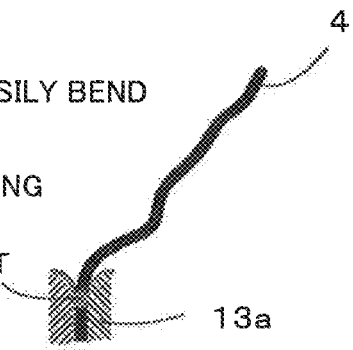
FIGS. 5A and 5B are views for explaining the bending of the wire electrode at a guide portion.

With regard to the problem "2) frictional forces are exerted on the wire electrode by the wire guide portions to adversely affect surface roughness":

In the conventional taper cutting technique, since the wire electrode 4 steeply bends at the wire guide portions, the wire electrode 4 cannot smoothly move within wire guide holes, and may cause vibrations. As a result, the wire electrode 4 may be broken, or streaks may be formed in a machined surface to deteriorate surface roughness (see FIG. 5A). If the wire electrode 4 can be held in a position perpendicular to the plane of the table, the wire electrode 4 is not steeply bent at the wire guide portions. Accordingly, taper cutting using the wire electric discharge machine according to the present invention solves the problem 2).

Figure 5B:
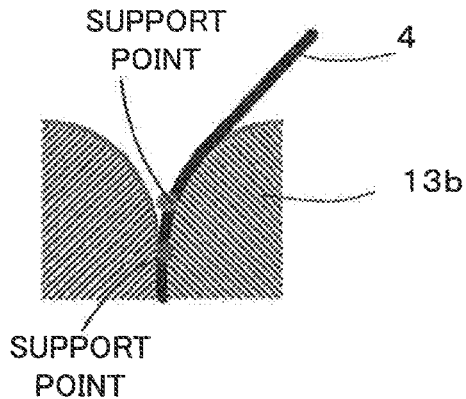
Figure 6:
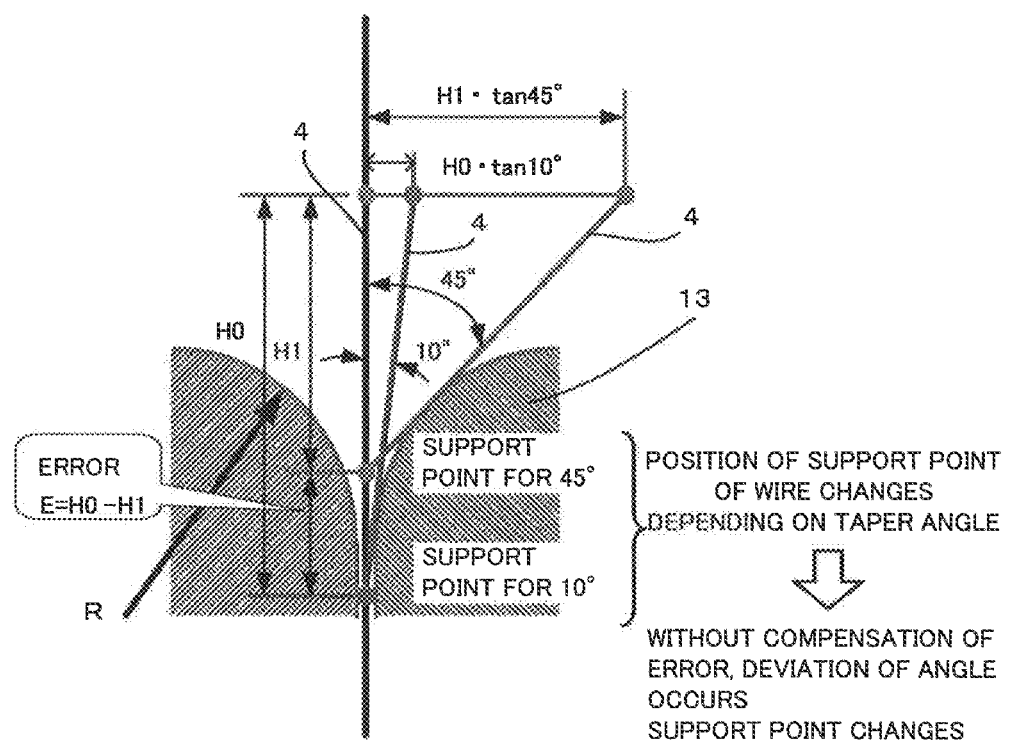
FIG. 6 is a view for explaining a support point error caused by the use of a guide having a large radius of curvature.

With regard to the problem "3) support points of the wire electrode bent by the wire guide portions change depending on the accuracies of the shapes of the guides and the state of machining, thus making accurate machining difficult":

When wire guides (see FIG. 5B) having large radiuses of curvature are used to cope with the problem 2), a support point error, which is another problem concerning accuracy, arises (see FIG. 6). However, since taper cutting using a wire electric discharge machine according to the present invention solves the problem 2) as described previously, the problem 3) is also solved.

With regard to the problem "4) it is difficult to set machining conditions":

In general, with regard to machining conditions for wire electrical discharge machining, conditions for vertical cutting are prepared for each of different plate thicknesses of the workpiece 3. However, conditions for taper cutting are not prepared. This is because it is very difficult to determine optimum machining conditions for taper cutting.

Figure 7A:
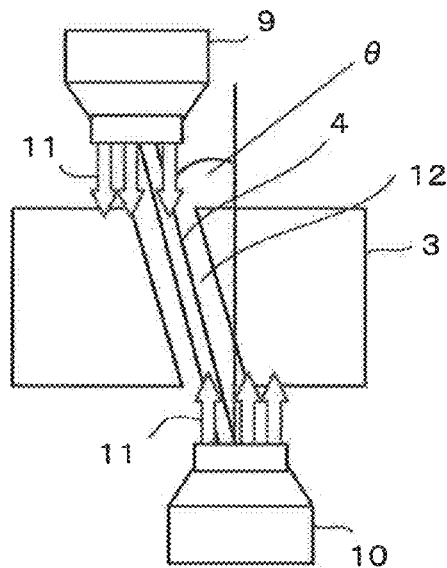
FIGS. 7A and 7B are views for explaining how to set a plate thickness, which is one of machining conditions.
Figure 7B:
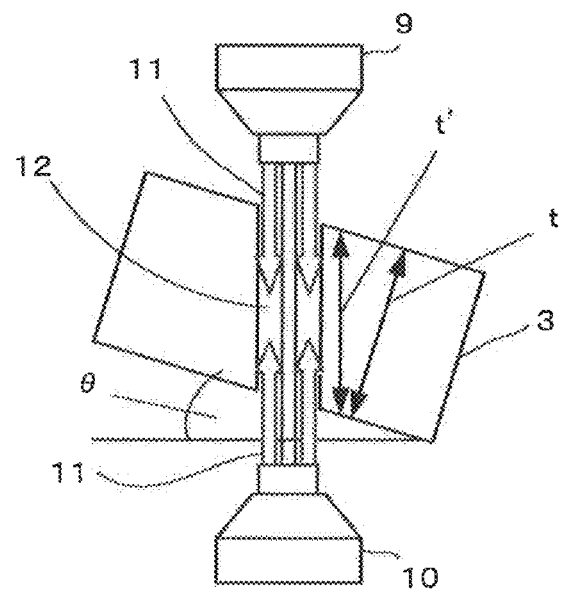

On the other hand, in the present invention, the wire electrode 4 is held in an upright position (vertically oriented). Accordingly, if a plate thickness during machining is denoted by t' and the original plate thickness of the workpiece 3 is denoted by t as shown in FIGS. 7A and 7B, the following expression (8) is obtained. It should be noted that FIG. 7A illustrates taper cutting of the prior art technique, and FIG. 7B illustrates taper cutting using the wire electric discharge machine according to the present invention.

$$t' = t/\cos\theta \quad (8)$$

This means that machining conditions for taper cutting can be obtained by finding the plate thickness t' for taper cutting of the present invention based on the plate thickness of the workpiece 3 and the taper angle and setting machining conditions for the vertical cutting of the workpiece 3 having a plate thickness of t'. Thus, taper cutting using a wire electric discharge machine according to the present invention solves the problem 4).

Next, one embodiment of the wire electric discharge machine according to the present invention which performs the above-described taper cutting will be described with reference to FIG. 8.

A wire electric discharge machine 70 is a machine which causes discharges between the wire electrode 4 and the workpiece 3 to machine the workpiece 3. The wire electric discharge machine 70 includes an X-axis saddle 19 on a base 20 and a Y-axis saddle 18 on the X-axis saddle 19. The X-axis saddle 19 is moved in the X-axis direction by a ball screw 31 driven by an X-axis motor 26. The Y-axis saddle 18 is moved in the Y-axis direction by a ball screw 30 driven by a Y-axis motor 25. A work tank 14 is fixed to the top of the Y-axis saddle 18. The work tank 14 contains a table 2 on which a mount device 44 (see FIG. 9) is mounted.

A column 21 stands upright on the base 20. A lower arm 42 is attached to a side surface of the column 21 to extend in a horizontal direction. A lower nozzle 10 and a lower guide 13a are attached to a tip of the lower arm 42. The lower nozzle 10 and the lower guide 13a are located below the table 2. A V-axis saddle 15 is disposed on the column 21. The V-axis saddle 15 is moved in the V-axis direction by a ball screw 34 driven by a V-axis motor 29. The V-axis direction is the same as the Y-axis direction. A U-axis table 16 is attached to the V-axis saddle 15. The U-axis table 16 is moved in the U-axis direction by a ball screw 33 driven by a U-axis motor 28. The U-axis direction is the same as the X-axis direction.

An upper arm support member 17 is attached to the U-axis table 16. The upper arm support member 17 is moved in the Z-axis direction by a ball screw 32 driven by a Z-axis motor 27. An upper arm 41 is fixed to the upper arm support member 17. An upper nozzle 9 and an upper guide 13b are attached to a tip of the upper arm 41. The Y-axis motor 25, the X-axis motor 26, the Z-axis motor 27, the U-axis motor 28, and the V-axis motor 29 are connected to a controller 50 with power and signal lines 35, 36, 37, 38, and 39. Each of the motors is supplied with power (electricity) from the controller 50 including amplifiers (not shown), and sends and receives various signals to and from the controller 50. It should be noted that in FIG. 8, the X axis and the U axis extend perpendicular to the plane of the drawing sheet, the Y axis and the V axis extend horizontally in the drawing sheet, and the Z axis extends vertically in the drawing sheet.

The work tank 14 is attached to the top of the Y-axis saddle 18. The table 2 is disposed in the work tank 14. The mount device (see FIGS. 9A and 9B) on which the workpiece 3 is mounted is fixed to the table 2. Discharge machining is performed with machining fluid 11 collected in the work tank 14. The upper nozzle 9 emits the machining fluid 11 to a top portion of the workpiece 3. The lower nozzle 10 emits the machining fluid to a bottom portion of the workpiece 3. The upper guide 13b in the upper nozzle 9 supports the wire electrode 4 above the workpiece 3, and the lower guide 13a in the lower nozzle 10 supports the wire electrode 4 below the workpiece 3.

The wire electric discharge machine 70 performs discharge machining between the wire electrode 4 and the workpiece 3 with the machining fluid 11 interposed therebetween. For stable discharge machining, a machining fluid pump 43 draws the machining fluid 11 from a reservoir (not shown) in which the machining fluid 11 is collected, and the machining fluid 11 is then passed through conduits 22, 23, and 24 and emitted from the upper and lower nozzles 9 and 10 to a portion to be machined at high pressure. Wire electrical discharge machining is performed while machining sludge in a machined groove 12 is being blown away by the emitted machining fluid 11.

The machining fluid pump 43 is connected to the controller 50 including an amplifier (not shown) with a power and signal line 40, and is driven and controlled by the controller 50. The machining fluid pump 43 is supplied with power (electricity) from the controller 50. The machining fluid pump 43 sends and receives signals to and from the controller 50. The machining fluid pump 43 supplies the machining fluid 11 to the upper nozzle 9 through a branch conduit 22 and a conduit 23, and supplies the machining fluid 11 to the lower nozzle 10 through the branch conduit 22 and a conduit 24. The upper nozzle 9 emits the machining fluid 11 to the portion to be machined during discharge machining. The lower nozzle 10 emits the machining fluid 11 to the portion to be machined during discharge machining.

The controller 50 is a device for comprehensively controlling the wire electric discharge machine. The controller 50 includes an arithmetic unit, a display device, and I/O interfaces and amplifiers for various kinds of signals, which are not illustrated. The controller 50 further includes a memory device 51 for storing various kinds of data. In FIG. 8, the arithmetic unit, display device, and I/O interfaces and amplifiers for various kinds of signals, which are not illustrated, are collectively referred to as a processing unit 52.

Figure 8:
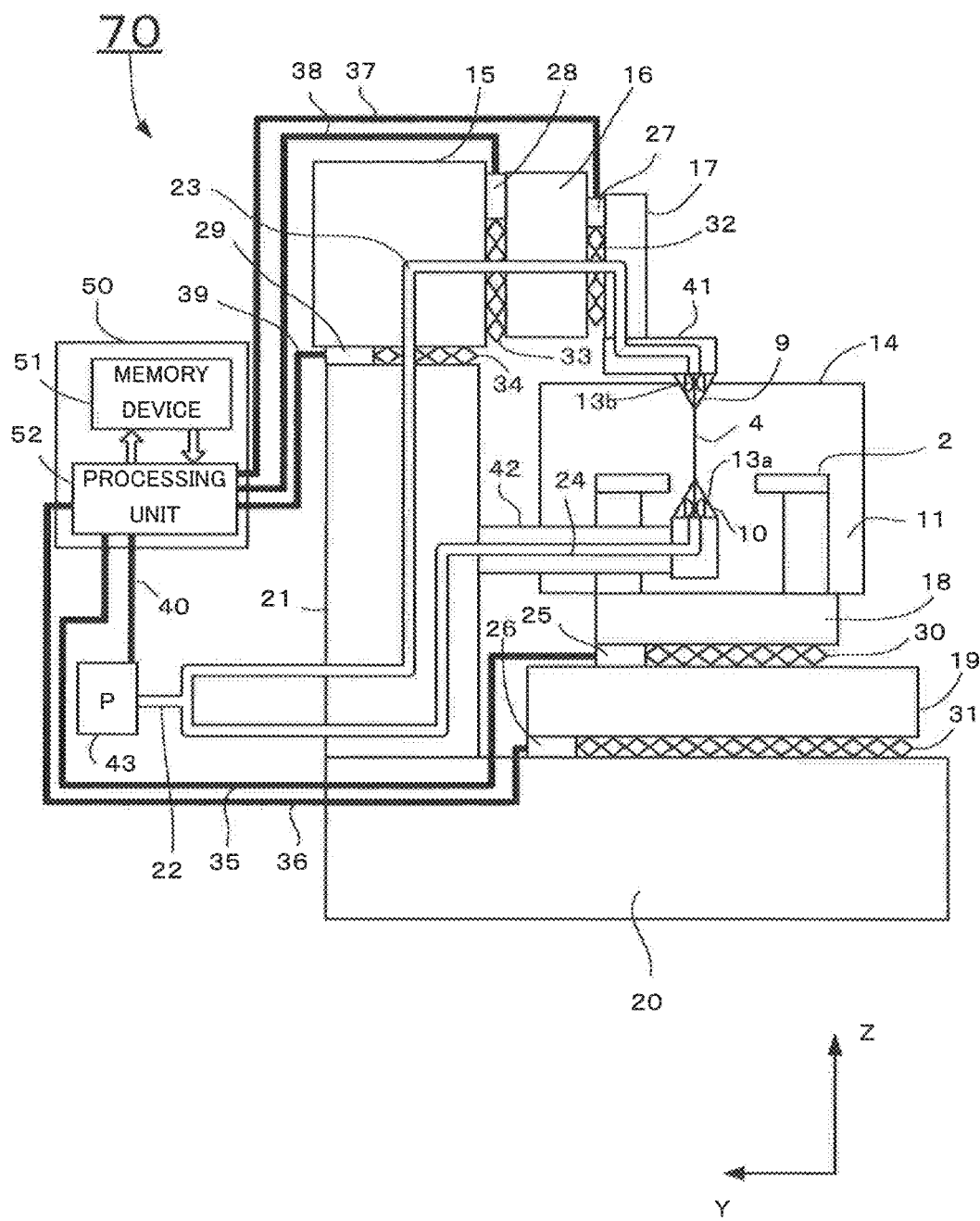
FIG. 8 illustrates one embodiment of a wire electric discharge machine according to the present invention which performs taper cutting.
Figure 9A:
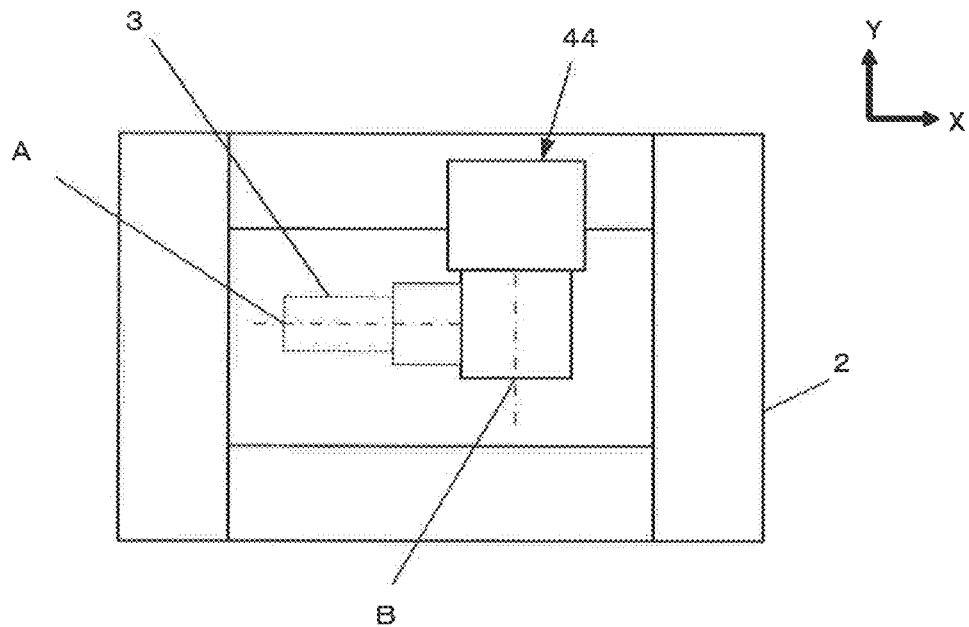
FIGS. 9A and 9B are views for explaining a mount device which is incorporated in the wire electric discharge machine of FIG. 8 and on which a workpiece is mounted.
Figure 9B:
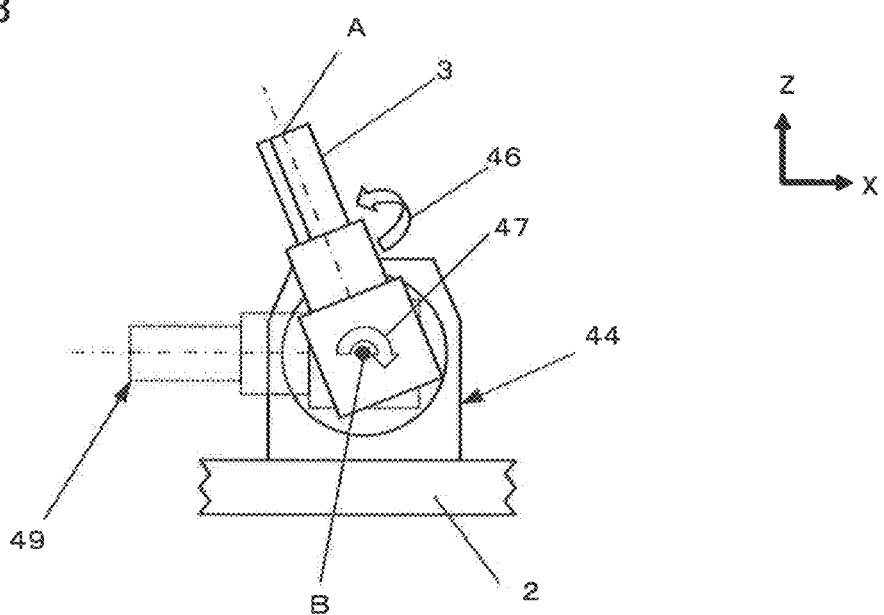

FIGS. 9A and 9B are views for explaining a mount device which is incorporated in the wire electric discharge machine of FIG. 8 and on which a workpiece is mounted.

The mount device 44, on which the workpiece 3 is mounted, includes a rotary axis A and a rotary axis B. Each of the rotary axes A and B is driven by an unillustrated servo motor (A-axis motor, B-axis motor). The servo motors (A-axis motor and B-axis motor) for driving the rotary axes A and B are driven and controlled by the controller 50 shown in FIG. 8 similarly to other moving axes.

The rotary axis A has an axis of rotation parallel to the X axis (in case where the rotary axis B is at a specific angle). The rotary axis B has an axis of rotation parallel to the Y axis. The rotary axis A is mounted on the rotary axis B. The workpiece 3 is fixed to the rotary axis A. When the rotary axis B is rotated, the rotary axis A itself mounted on the rotary axis B rotates in the direction of an arrow 47. When the rotary axis A is rotated, the workpiece 3 rotates in the direction of an arrow 46. This configuration makes it possible to change the tilt of the workpiece 3 as desired. The machine configuration of the mount device 44 including the rotary axis A and rotary axis B is stored as parameters on the memory device 51 of the controller 50.

Next, the taper cutting of the workpiece 3 using the wire electric discharge machine according to the present invention will be described.

Figure 10A:
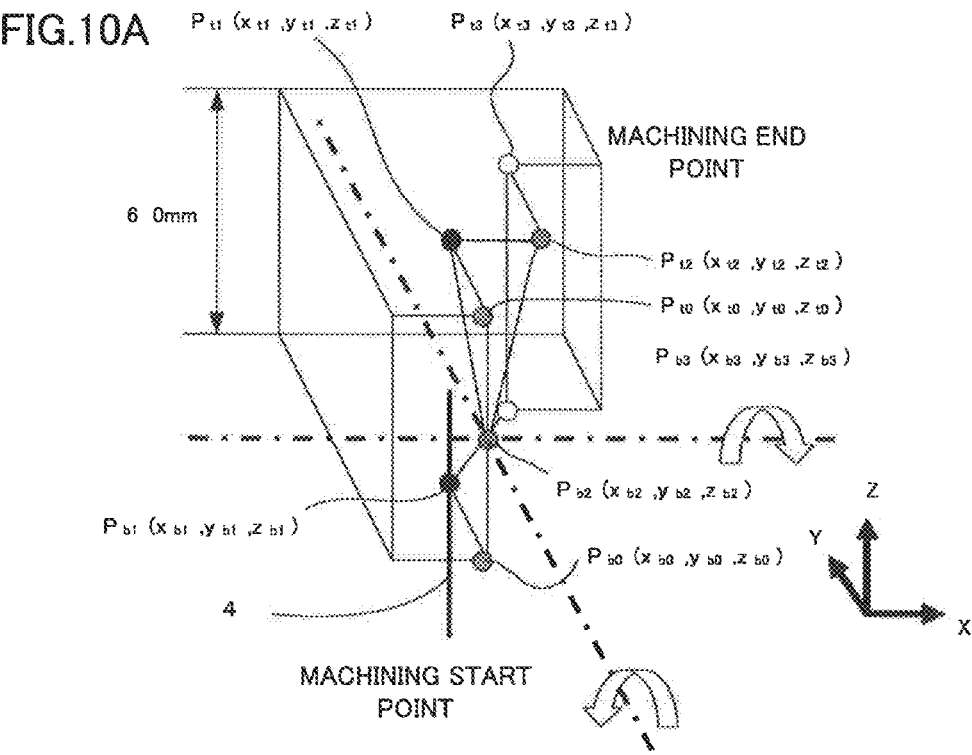
FIGS. 10A, 10B, and 10C are views for explaining taper cutting using the wire electric discharge machine according to the present invention.
Figure 10B:
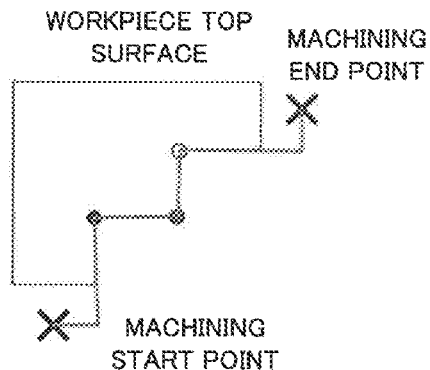
Figure 10C:
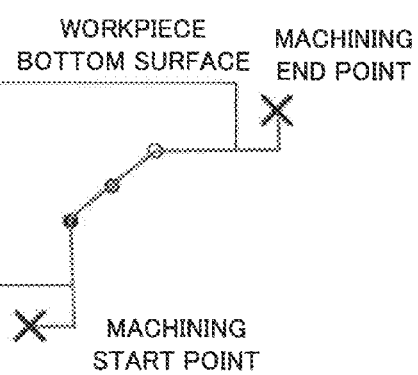

The mount device 44 having the workpiece 3 mounted thereon, shown in FIGS. 9A and 9B, is attached to the table 2 of the wire electric discharge machine 70 shown in FIG. 8. Then, using this wire electric discharge machine 70, taper cutting is performed on the workpiece 3 mounted on the mount device 44. An example of the machining of the workpiece 3 in which the shape of a top surface is different from that of a bottom surface, such as shown in FIGS. 10A, 10B, and 10C, will be described. It should be noted that the workpiece 3 is assumed to be capable of being tilted about axes of rotation passing through a point $P_{b2}$ and intersecting the XZ and YZ planes at right angles, respectively.

FIG. 11 illustrates a machining program for the machining of the workpiece 3 shown in FIG. 10A. Operations in accordance with the machining program will be described.

First, the command G666P1 enables the function of taper cutting according to the present invention.

The command M15 enables the function of taper cutting (a function of a prior art wire electric discharge machine).

The command G92X5.Y-35. sets a coordinate system for the machining program and a machining start point (5,×35).

The command G90G01G42X10. moves the wire electrode 4 to the machining start point compensated by an offset.

The command Y-30. moves the workpiece-top side of the wire electrode 4 toward a point $P_{t0}$ and the workpiece-bottom side of the wire electrode 4 toward a point $P_{b0}$.

The command Y-20. moves the workpiece-top side of the wire electrode 4 toward a point $P_{t1}$ and the workpiece-bottom side of the wire electrode 4 toward a point $P_{b1}$.

The tilt angle of the wire electrode 4 in the YZ plane in accordance with the command X20.U-5.V5. is denoted by θ. Machining is performed while the tilt of the workpiece 3 is being relatively changed with respect to the wire electrode 4. The tilt θ of the wire electrode 4 in the YZ plane is expressed as the following expression (9):

$$\theta = \tan^{-1}((y_t - y_b)/(z_t - z_b)) \quad (9)$$

Here, $y_t - y_b$ is found from the command value for the V axis, and $z_t - z_b$ is the plate thickness of the workpiece. Accordingly, the tilt angle θ is calculated from the following expression (10):

$$\theta = \tan^{-1}(5/60) = 4.76364 \quad (10)$$

Similarly, the tilt angle in the XZ plane is also calculated to be 4.76364. With regard to axis operations, operations of the U and V axes are replaced by operations of the rotary axes A and B. From the directions of rotation of the rotary axes shown in FIGS. 9A and 9B, it can be seen that operations in accordance with this command X20.U-5. V5. are equivalent to those in accordance with the following command:

X20.A4.76364B4.76364

The command Y-10.U0.V0. moves the workpiece-top side of the wire electrode 4 toward a point $P_{t3}$ and the workpiece-bottom side of the wire electrode 4 toward a point $P_{b3}$ with the wire electrode 4 held in an upright position (vertically oriented). The command X35. moves the wire electrode 4 to a point outside the workpiece 3.

The command G40Y-5. moves the wire electrode 4 toward a machining end point.

Finally, the command G666P0 disables the function of taper cutting according to the present invention, and ends the machining.

It should be noted that G666P1 and G666P0 may be preset using program commands or an interactive setup screen or the like. Moreover, this embodiment has been described by taking as an example the case where the axes of rotation pass through the point $P_{b2}$ and intersect the XZ plane and the YZ plane at right angles, respectively, i.e., the case where the axes of rotation are parallel to the X and Y axes, respectively, but it is obvious that a similar result is obtained in the case where the axes of rotation are not parallel to the X and Y axes, respectively.

As described above, in a taper cutting technique according to the present invention, since machining can be performed with the wire electrode 4 held in an upright position (vertically oriented) while the tilt of the workpiece 3 is being changed (see FIGS. 12A, 12B, and 12C), the aforementioned problems do not occur.

Figure 13A:
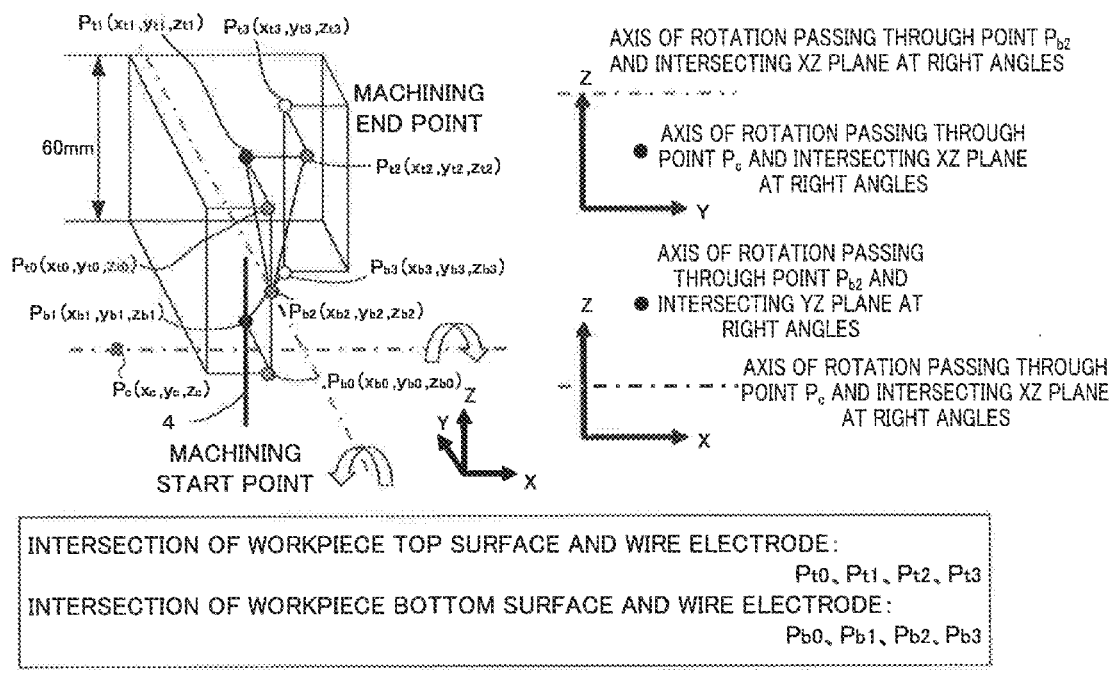
FIGS. 13A, 13B, and 13C are views for explaining that in the case of taper cutting using the wire electric discharge machine according to the present invention, a workpiece can be tilted about an axis of rotation passing through a first point and intersecting the XZ plane at right angles and an axis of rotation passing through a second point and intersecting the YZ plane at right angles.
Figure 13B:
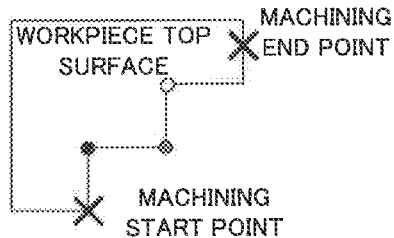
Figure 13C:

Next, an example of machining such as shown in FIGS. 13A, 13B, and 13C will be described in which the workpiece 3 can be tilted about an axis of rotation passing through a point $P_{b2}$ and intersecting the XZ plane at right angles and an axis of rotation passing through a point $P_c$ and intersecting the YZ plane at right angles.

The same machining program as in the above example, shown in FIG. 11, is used. Operations in accordance with the machining program will be described.

First, the command G666P1 enables the function of taper cutting according to the present invention.

The command M15 enables the function of taper cutting.

The command G92X5.Y-35. sets a coordinate system for the machining program and a machining start point (5,−35).

The command G90G01G42X10. moves the wire electrode 4 to the machining start point compensated by an offset.

The command Y-30. moves the workpiece-top side of the wire electrode 4 toward a point $P_{t0}$ and the workpiece-bottom side of the wire electrode 4 toward a point $P_{b0}$.

The command Y-20. moves the workpiece-top side of the wire electrode 4 toward a point $P_{t1}$ and the workpiece-bottom side of the wire electrode 4 toward a point $P_{b1}$.

Figure 14:
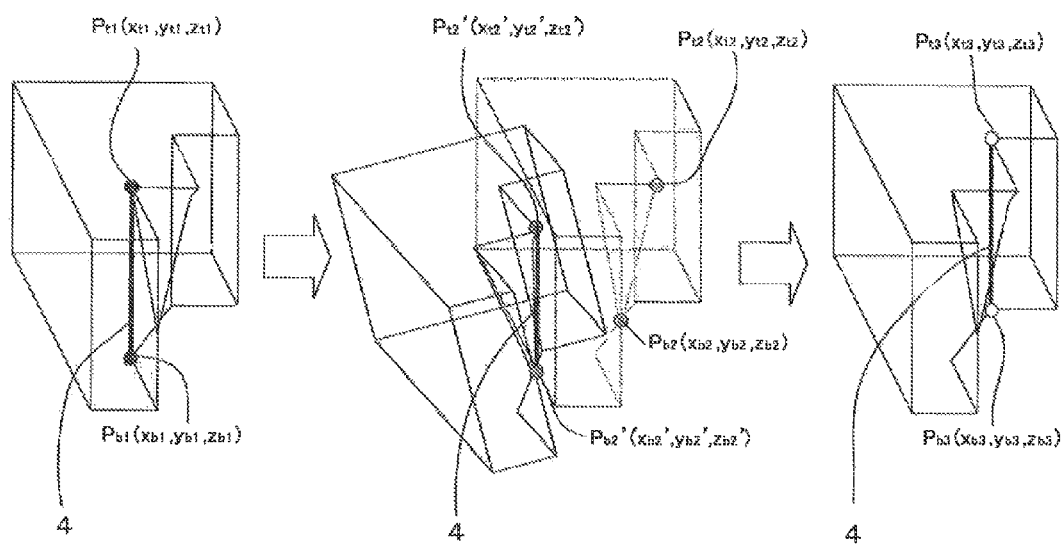
FIG. 14 is a view for explaining that in the case of taper cutting using the wire electric discharge machine according to the present invention, the workpiece-top side of the wire electrode moves toward a first point and the workpiece-bottom side of the wire electrode moves toward a second point.
Figure 15:
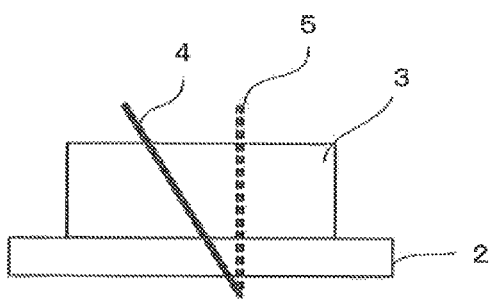
FIG. 15 is a view for explaining conventional taper cutting by wire electrical discharge machining.
Figure 16A:
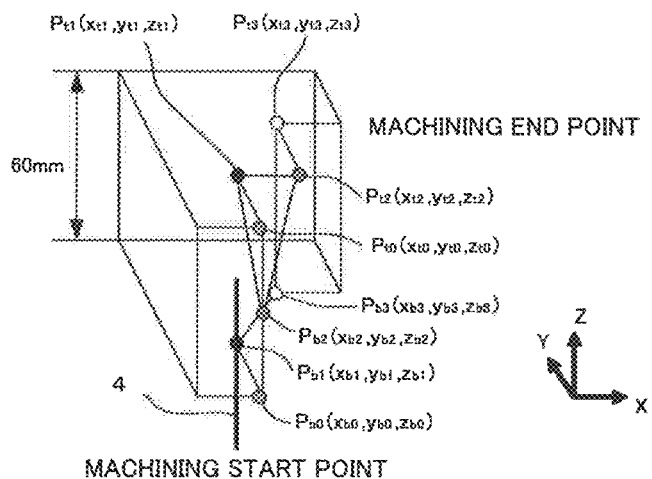
FIGS. 16A, 16B, and 16C is a view for explaining taper cutting by a conventional taper cutting technique.
Figure 16B:
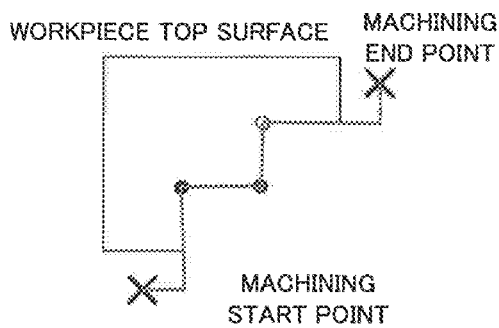
Figure 16C:
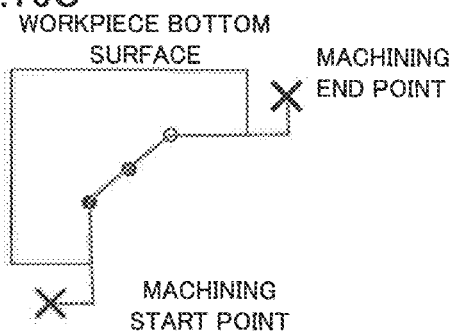

The command X20.U-5.V5. moves the workpiece-top side of the wire electrode 4 toward a point $P_{t2}''$ and the workpiece-bottom side of the wire electrode 4 toward a point $P_{b2}''$ (see FIG. 14).

The tilt angle θ' of the workpiece 3 at this time is found by a process similar to that in the aforementioned embodiment.

The command Y-10.U0.V0. moves the workpiece-top side of the wire electrode 4 toward a point $P_{t3}$ and the workpiece-bottom side of the wire electrode 4 toward a point $P_{b3}$ while returning the rotary axes to original positions.

The command X35. moves the wire electrode 4 to a point outside the workpiece 3.

The command G40Y-5. moves the wire electrode 4 toward a machining end point.

Finally, the command G666P0 disables the function of taper cutting according to the present invention, and ends the machining.

In this case, again, effects similar to those of the aforementioned embodiment are exerted, and therefore the problems of the prior art techniques previously described do not occur.

Moreover, though rotation matrices are used in the present embodiment, a taper cutting technique according to the present invention using other mathematical technique, e.g., quaternions, also have similar effects.

The invention claimed is:

1. A wire electric discharge machine, comprising:
   a wire electrode;
   a table on which a workpiece is to be mounted;
   at least two linear axes configured to move the wire electrode and the workpiece relative to each other;
   a mount device to which the workpiece is attachable and which is mountable on the table, the mount device having at least two rotary axes; and
   a control unit configured to
      generate, based on (i) a tilt angle of the wire electrode and amounts of travel of the wire electrode by the linear axes relative to the workpiece, the tilt angle and the amounts of travel being commanded by a machining program, and on (ii) prestored axes of rotation of the rotary axes,
         renewed amounts of travel of the wire electrode relative to the workpiece in a relative movement between the wire electrode and the workpiece and amounts of rotation of the rotary axes for performing machining with the wire electrode vertically oriented, and
      synchronously move the linear axes and the rotary axes in accordance with the generated renewed amounts of travel of the wire electrode relative to the workpiece and amounts of rotation of the rotary axes to perform machining while relatively changing a tilt of the workpiece with respect to the wire electrode.

2. A wire electric discharge machine, comprising:
   a wire electrode;
   a table on which a workpiece is to be mounted;
   at least two linear axes configured to move the wire electrode and the workpiece relative to each other;
   a mount device to which the workpiece is attachable and which is mountable on the table, the mount device having at least two rotary axes; and
   a control unit configured to
      convert, based on (i) a tilt angle of the wire electrode and amounts of travel of the wire electrode, the tilt angle and the amounts of travel being commanded by a machining program, and on (ii) prestored axes of rotation of the rotary axes,
         a command for tilting the wire electrode and a command for moving the wire electrode relative to the workpiece in the machining program for performing machining with the wire electrode vertically oriented,
         to a command for moving the wire electrode with respect to the workpiece and a command for rotating the rotary axes, and
      synchronously move the linear axes and the rotary axes in accordance with the converted command for tilting the wire electrode and command for moving the wire electrode relative to the workpiece in the machining program to perform machining while relatively changing a tilt of the workpiece with respect to the wire electrode.

3. The wire electric discharge machine according to claim 1, wherein the control unit is configured to
   find rotation matrices using the axes of rotation and the tilt angle of the wire electrode from a vertical direction, and
   generate the renewed amounts of travel of the wire electrode relative to the workpiece and amounts of rotation of the rotary axes using the found rotation matrices.

* * * * *